INVENTORS.
DONALD G. ANDERSON,
RAYMOND H. PFREHM,
BY
ATTORNEY.

United States Patent Office 3,384,419
Patented May 21, 1968

3,384,419
TRANSPORTATION OF POTASH BY PIPELINE
Donald G. Anderson and Raymond H. Pfrehm, Houston, Tex., assignors to Esso Research and Engineering Company, a corporation of Delaware
Filed Mar. 31, 1966, Ser. No. 539,061
6 Claims. (Cl. 302—14)

ABSTRACT OF THE DISCLOSURE

Granular potash is added to a saturated solution of magnesium chloride in water to form a stable suspension on addition thereto of a specific amount of attapulgite for transporation of the potash by pumping through a pipeline

---

Figure 1:
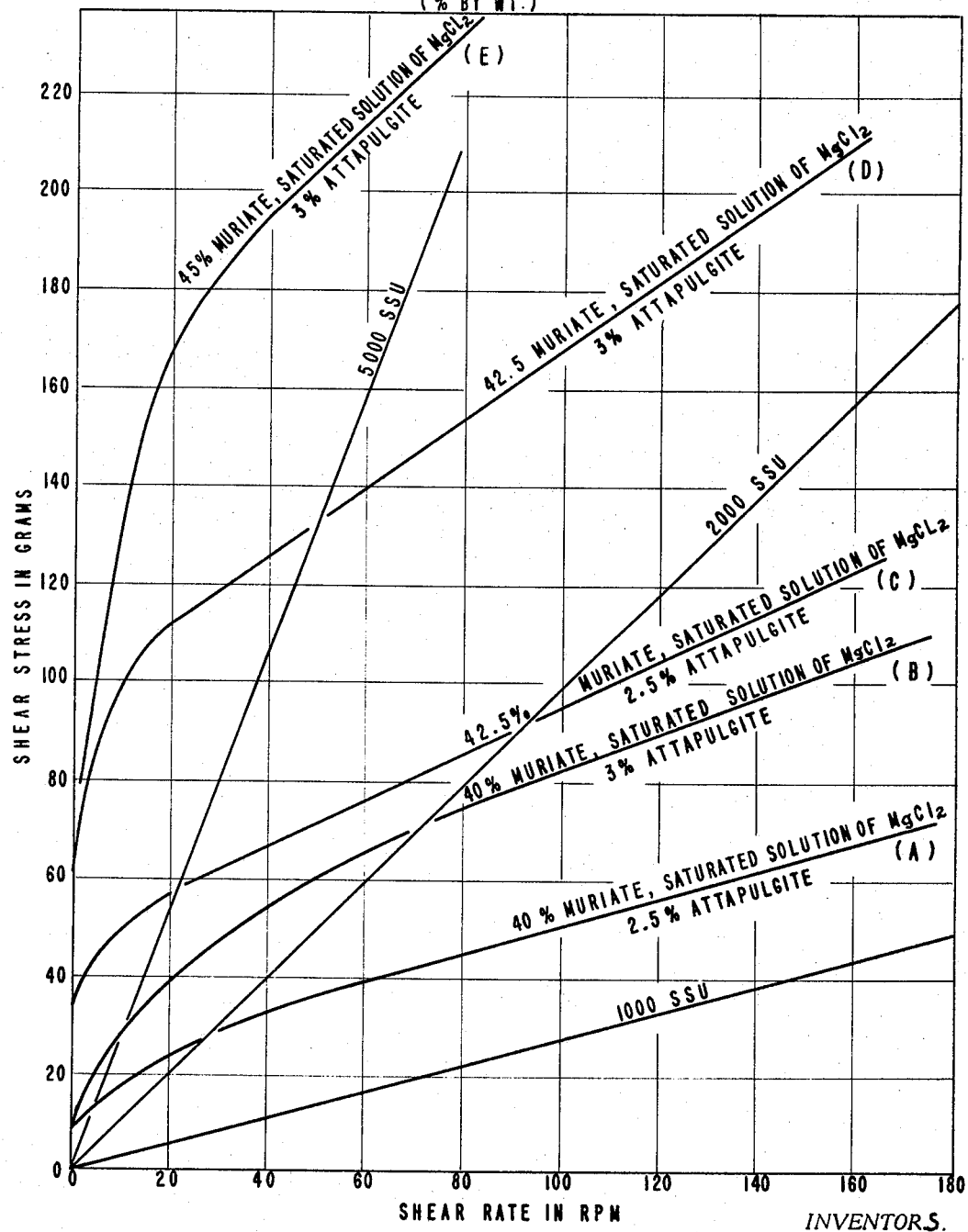

The present invention is concerned with the transportation of potash by pipeline. More particularly, the invention is concerned with the formation and pumping of stable suspensions of granular potash. In its more specific aspects, the invention is concerned with a pumpable suspension of granular potash in a saturated solution of a salt in water.

The present invention may be briefly described as a method of transporting granular potash in which a stable suspension of granular potash and a saturated solution of magnesium chloride in water is formed. The suspension is stabilized by incorporating in the suspension a stabilizing amount of attapulgite. The stable suspension is then pumped through the pipeline and, from the suspension as received at the terminus of the pipeline, the granular potash and the saturated solution are recovered for use as may be desired.

The stable suspension suitably has a Stormer viscosity at 100 r.p.m. within the range from about 1000 to about 2000 SSU.

The stable suspension is made up of a saturated solution of magnesium chloride in which the saturated solution has a pH of about 3. The suspension contains from about 38% to about 42.5% by weight of granular potash and about 2.5% by weight of attapulgite.

The potash employed in the present invention preferably is potassium chloride. However, there are many potash sources and it is considered that where potash is mentioned, it will include potassium chloride which is a refined salt of potassium, soluble in water, having a specific gravity of about 2.12 and made up of clear crystalline cubes smaller than 40 mesh and larger than 100 mesh. Potassium sulfate is also encompassed within the term potash. Potassium sulfate is soluble in water and has a specific gravity of 2.65. The particles are chalky white, sub-angular with near even particle size distribution through a 10 mesh on a 200 mesh screen. The term potash also includes the double sulfate of potassium and magnesia which is a chalky gray to white water soluble salt having a specific gravity of about 2.75. Ninety-eight percent of the particles are smaller than 6 mesh and larger than 20 mesh and appear to be sub-rounded and non-crystalline. Potassium muriate for example is received in regular and granulated forms with the granulated forms being composed of regular particles cemented together and larger than 10 mesh, about 90% of the regular particles are smaller than 10 mesh and larger than 40 mesh. Potassium muriate is soluble in water and has a specific gravity of 1.85 and is composed of gray and rose colored angular particles.

The term potash also includes refined potassium muriate containing about 95% potassium chloride. This material is representative of potash available commercially. The data included herein used to illustrate the present invention was obtained with potash containing about 95% potassium chloride and is sometimes referred to as potassium muriate.

The transportation of potash from the mine site to the place where it is to be used is expensive since the mines are usually located in areas remote from manufacturing centers. Ordinary sources of transportation are expensive and it is therefore desirable to transport potash through a pipeline. In accordance with the present invention, this is accomplished by suspending the granulated particles of potash in a saturated solution of magnesium chloride which is available at the mine site. Magnesium chloride is a by-product of the refining of potash. Saturated solutions of the magnesium chloride may be formed at the mine site and used to suspend the potash which is insoluble in a saturated solution of magnesium chloride. The magnesium chloride may be used for recovery of magnesium by suitable electrolytic processes which are well known.

Heretofore it has not been possible to form stable suspensions of granular potash in saturated solutions of magnesium chloride. However, in accordance with the present invention, it has been found that attapulgite, which is a commercially available clay, is quite useful in forming stable suspensions of potash in saturated solutions of magnesium chloride. Other clays are unsuitable since free potassium and excess chloride ions in solution cause a cation exchange which flocculates the clay. However, in the case of magnesium chloride slurries or suspensions of potash, it has been found that attapulgite is quite effective in forming a stable suspension since attapulgite is inert to cation exchange in solutions above a pH of about 3. Thus, in accordance with the present invention, the slurries or suspensions are formed with the potash and the saturated solutions, and a pH above about 3 is maintained.

The suspension is believed to be created by rod or needle-like particles of the attapulgite aligning themselves in a chain-like crystalline lattice which is unaffected by free cations. Thus, the attapulgite in accordance with the present invention allows the obtaining of stable suspensions or slurries of potash in saturated solutions of magnesium chloride. This is quite important and useful and allows the formation of the stable suspensions and subsequent pumping of same through a pipeline.

In order to illustrate the present invention further, a number of slurries or suspensions were made up and tested for pumpability as reflected by the Stormer viscosity. In one case, as illustrated in FIGURE 1, a plot of data was made for various suspensions of potassium muriate in saturated solutions of magnesium chloride. In each instance an effective amount of attapulgite was added to stabilize the suspensions.

Referring now to FIGURE 1, slurry C which contains 42.5% of potassium muriate in a saturated magnesium chloride brine containing 2.5% attapulgite was stable and proved pumpable in pumping tests. Slurries A and B which contained smaller amounts of potassium muriate and larger amounts of attapulgite were also pumpable but tended toward the unstable but are not unsatisfactory.

It will be noted, however, that slurries D and E reflect the effect of larger amounts of attapulgite. Comparing slurries D and C, it will be seen that an additional 0.5% attapulgite at the same amount of potassium muriate increased the viscosity to the extent that slurry D is not pumpable. The same is true with respect to slurry E which contains larger amounts of potassium muriate. In making up other slurries, it was found that a stable suspension could not be achieved with less than 2.5% attapulgite with saturated solutions of magnesium chloride. The data show, however, that up to about 3.0% by weight of attapulgite may be used with magnesium chloride solutions.

The attapulgite employed in the present invention is the attapulgite such as identified in the work entitled "X-Ray Identification and Crystal Structures of Clay Minerals," edited by G. W. Brindley; London: 1951; The Mineralogical Society. Attapulgite is a well known article of commerce, the chemical composition and physical characteristics of which will be found in the literature.

In transporting granular potash in accordance with the pesent invention, the suspension may be made up by first forming a saturated solution in the case of magnesium chloride and then adding the saturated solution to the pipeline followed by addition of attapulgite and then the granular potash in the amounts set out herein. The saturated solutions employed in the practice of the present invention employed in the practice of the present invention were formed at temperatures in the range from about 60° to about 80° F.

In the data illustrated in FIGURE 1, the Stormer viscosity was obtained in the well known Stormer viscosity technique except that a modified Stormer cup was used. The modification from the standard cup was that the standard cup has two partitions which extend from the cup wall to a point in close proximity to the spindle, while the modified cup has no partitions but has a pedestal in the center to retard rotation of the slurry being tested. This modified cup was used in all the viscosity determinations shown in FIGURES 1 and 2.

The nature and objects of the present invention having been completely described and illustrated and the best mode contemplated set forth, what we wish to claim as new and useful and secure by Letters Patent is:

1. A method of transporting granular potash which consists essentially of:
   forming a stable suspension containing from about 38% to about 42.5% by weight of granular potash and a saturated solution of magnesium chloride in water;
   said stable suspension containing a stabilizing amount within the range from about 2.5% to about 3.0% by weight of attapulgite;
   pumping said suspension through a pipeline; and
   recovering said granular potash and said saturated solution from said pipeline.

2. A method in accordance with claim 1 in which the potash is potassium chloride containing at least about 95% by weight of KCl.

3. A method in accordance with claim 1 in which the potash is potassium chloride having crystalline particles smaller than about 40 and larger than about 100 mesh.

4. A method in accordance with claim 1 in which the stable suspension has a Stormer viscosity at 100 r.p.m. within the range from about 1000 to about 2000 SSU.

5. A method in accordance with claim 1 in which the saturated solution has a pH of about 3.

6. A stable suspension which consists essentially of:
   granular potash in an amount from about 38% to about 42.5% by weight and a saturated solution of magnesium chloride in water;
   said stable suspension containing a stabilizing amount within the range from about 2.5% to about 3.0% by weight of attapulgite.

References Cited

UNITED STATES PATENTS

| | | | |
|---|---|---|---|
| 2,610,901 | 9/1952 | Cross | 302—66 |
| 2,703,272 | 3/1955 | Fuchsman | 23—89 |
| 3,046,221 | 7/1962 | Dodd | 252—8.5 |

ANDRES H. NIELSEN, *Primary Examiner.*